United States Patent
Ilan

(10) Patent No.: US 9,148,257 B2
(45) Date of Patent: Sep. 29, 2015

(54) METHOD AND APPARATUS FOR REDUCING DELAYS IN A PACKETS SWITCHED NETWORK

(75) Inventor: Amir Ilan, Hod Hasharon (IL)

(73) Assignee: Dialogic Networks (Israel) Ltd. (IL)

( * ) Notice: Subject to any disclaimer, the term of this patent is extended or adjusted under 35 U.S.C. 154(b) by 475 days.

(21) Appl. No.: 13/634,931

(22) PCT Filed: Mar. 8, 2011

(86) PCT No.: PCT/IL2011/000220
§ 371 (c)(1),
(2), (4) Date: Sep. 14, 2012

(87) PCT Pub. No.: WO2011/114323
PCT Pub. Date: Sep. 22, 2011

(65) Prior Publication Data
US 2013/0010800 A1    Jan. 10, 2013

(30) Foreign Application Priority Data
Mar. 16, 2010 (IL) .......................... 204515

(51) Int. Cl.
*H04L 1/00* (2006.01)
*H04L 1/08* (2006.01)
*H04L 12/46* (2006.01)

(52) U.S. Cl.
CPC .............. *H04L 1/08* (2013.01); *H04L 1/0084* (2013.01); *H04L 12/4633* (2013.01)

(58) Field of Classification Search
USPC ......... 370/216, 228, 473, 493, 495, 529, 227, 370/349, 389, 395.3, 474, 498
See application file for complete search history.

(56) References Cited

U.S. PATENT DOCUMENTS

| | | | |
|---|---|---|---|
| 6,732,314 B1 | 5/2004 | Borella et al. | |
| 7,715,311 B2 * | 5/2010 | Herrmann | 370/227 |
| 7,885,263 B2 * | 2/2011 | Sun et al. | 370/392 |
| 2004/0081081 A1 * | 4/2004 | Colombo | 370/216 |
| 2006/0013330 A1 * | 1/2006 | Ha | 375/267 |
| 2008/0056140 A1 * | 3/2008 | Shida et al. | 370/242 |
| 2009/0201805 A1 | 8/2009 | Begen et al. | |
| 2010/0002644 A1 * | 1/2010 | Choi et al. | 370/329 |
| 2012/0005553 A1 * | 1/2012 | Yamaguchi et al. | 714/752 |
| 2013/0294225 A1 * | 11/2013 | Zhang et al. | 370/216 |

FOREIGN PATENT DOCUMENTS

WO    WO 2011/006538    1/2011

* cited by examiner

*Primary Examiner* — Kwang B Yao
*Assistant Examiner* — Nguyen Ngo
(74) *Attorney, Agent, or Firm* — Chapin IP Law, LLC

(57) ABSTRACT

A method and device for reducing delays of communication packets that comprise: providing a plurality of data frames belonging to different communication sessions conveyed along respective communication channels; providing protection data for protecting at least one of these data packets; and multiplexing one or more of the data frames into a second communication packet. This second communication packet comprises protection data for protecting at least one first data frame that had already been transmitted in a first communication packet that preceded the transmission of the second communication packet; the protection data is attached to a second data frame comprised in that second communication packet; the protection data is operative to protect a first data frame comprised in the first communication packet; and wherein each of the first and second data frames belongs to a different communication session.

13 Claims, 3 Drawing Sheets

METHOD AND APPARATUS FOR REDUCING DELAYS IN A PACKETS SWITCHED NETWORK

TECHNICAL FIELD

The present invention relates in general to efficient transmission of IP packets. In particular it relates to method and apparatus for reducing delays while receiving signals transmitted along a packets switched network.

BACKGROUND

The fast growth of the Internet has stimulated the development of IP networks. At present there is a clear trend to use IP networks not only for traditional Internet traffic but to provide all telecommunication services using this infrastructure. One of these applications is transmission of telephony traffic over IP networks by converting the different types of media traffic (such as video, audio, voice, etc.) to IP packets.

Unfortunately, video and voice communications, when carried over the Internet which is a best effort type of network, may fail to deliver PSTN like quality. The standard Internet Protocol (IP) developed to govern communications over public and private Internet backbones does not guarantee any quality of service (QoS). IP communications continue to suffer from delay related problems, delay jitter and packet loss, all associated with bandwidth availability. Low QoS can be tolerated with certain types of data such as Email and data downloads from remote Web sites since these communications may be repeated several times until the information has correctly been transferred. However, with real-time video, voice or data communications, such as telephone or video conference conversations or even dial-up modems sessions, reliability and QoS become significant issues. In other words, delays, delay jitter and loss can significantly impact the user's ability to receive and comprehend voice or video communications.

One of the major concerns in transmitting such real-time communications is, that data packets can be lost while conveying them along the transmission path, consequently, leaving gaps in the communication session. Typically, IP and UDP environments provide unreliable networks. Data packets can be lost or delayed for a variety of reasons, such as bandwidth congestion, unavailable routes, defective Internet engines, etc. If the data packet is lost, the only way to retrieve it is if the destination gateway receives a copy of the lost data packet. Particularly in cases where the receiving of such a copy requires transmitting a request to receive that copy which is sent from the destination gateway to the originating gateway, such a process adds substantial delays to receiving the message, thus degrading the quality of the voice communication to such an extent that the medium becomes unsuitable for real-time communications.

One approach that has been adopted to overcome at least to a certain extent this problem is, by having constant a priori re-transmission of packets in the attempt to ensure that at least one the packet's copies will reach its destination, thereby allowing the receiving side to obtain all information that has been transmitted.

In packetized networks, the communication signals are converted into IP packets using Real-time Transport Protocol ("RTP")/User Datagram Protocol ("UDP")/Internet Protocol ("IP"), RTP/UDP/IP connection. RTP is an Internet protocol for transmitting real-time data such as voice, audio and video. RTP itself does not guarantee real-time delivery of data, e.g. retransmission of undelivered packets, but it does provide mechanisms for the sending applications to support streaming data including a mechanism for iterative re-transmission of packets named RTP redundancy by which, each communication packet is retransmitted several times. However, in order to reduce the number of communication packets and the overhead associated therewith, each such communication packet comprises the current data frame and N previous data frames. The main drawback of this method is the gaps between the re-transmitted packets, which are a product of the basic packet duration. Therefore, when the first m replicas of the data packet are lost, the accumulative delay might reach m*packet duration (e.g. ~3*20 msec). Typically, RTP runs on top of the UDP protocol. UDP is a connectionless protocol that, like TCP, runs on top of IP networks. Unlike TCP/IP, the UDP/IP provides no error recovery services, offering instead a direct way to send and receive datagrams over an IP network. In addition to RTP carrying VoIP packets, UDP is used to transmit other telephony signals such as demodulated facsimile signals according to ITU Recommendation T.38, and or demodulated dial modems transmissions (e.g. transmissions that are compatible with ITU-T v.15 Recommendation.

VoIP media-gateways provide an interface between existing TDM based networks packet switched IP data networks. For example, in a VoIP application the voice samples are compressed using a compression algorithm such as G.729. This algorithm is operative to convert a block of 80 voice samples (10 msec) into a compressed signal of 10 bytes. Typically, two consecutive frames of compressed voice (20 bytes) are transmitted in one IP packet every msec interval. As will be appreciated, small size communication packets are subjected to large overhead when transferred using the Real time Transport Protocol (RTP), as the RTP/UDP/IP overhead is 40 bytes (12+8+20) for a simple speech packet. For example, for a 20 byte packet transferred via RTP/UDP/IP the overhead presents 67% of the packet (40 byte overhead/(40+ 20) byte in a packet). In addition, for each voice channel, a single UDP/IP connection (a pair of UDP ports) is established between the media-gateways. This requires significant resources at the media-gateway and generates many small size packets on the IP network that may cause congestion at the network routers.

In the attempt to address the problem of the overhead associated with the communication packets being transmitted, one of the suggested approaches of conveying IP traffic in packetized networks is by tunneling. Tunneling, also known as encapsulation or channel multiplexing, refers to the practice of encapsulating a message from one protocol in a second, and using the facilities of the second protocol to traverse some number of network hops. In other words, the communication packets are "wrapped" with another protocol while they are being conveyed towards their destinations, and once they reach their respective destinations, they may be "unwrapped". Typically, many users use the same tunnel, which in turn might affect the service of many users.

In order to reduce some of the header overload when a session such as a VoIP session takes place, the channel carrying all the packets associated with the packets transmitted from one side to the other will be forwarded together with other channels within a single tunnel, ensuring that the packets are sent consecutively as well as their respective copies, to their destination. Tunneling should be associated with certain type of mini-headers that replace the original headers used to identify each of the sessions and achieve better efficiency.

The introduction of the RTP redundancy method into the "tunnel" concept might introduce more delays and might lead to reduced protection capabilities. When the session involves transmitting data for applications such as Email or WEB browsing, the receiver may tolerate delays in receiving the data packets without sacrificing the perceived service quality. However, for interactive real-time applications such as conversational voice and video over IP services, delays in delivering communication packets can significantly impair the parties' ability to communicate with each other in a satisfactory fashion. In addition, since the originating gateway must wait until a minimal required number of frames are aggregated into a communication packet is achieved, it is likely that the original frame is transmitted in one packet while its copy is transmitted in a proceeding (or even a later) packet. In such a case, the latency may be further increased.

A number of protocols have been developed over the years to assist in improving the efficiency at which the available bandwidth is used for transmitting packets and for providing protection for data contained in these packets. Among these protocols are the following ones:

Examples for Mux/Tunneled IP Protocols:
TCRTP
GRE IP tunnel
Examples for Header Compression Protocols:
IETF RFC 1144 (CTCP) header compression standard was developed by V. Jacobson in 1990. It is commonly known as VJ compression. It describes a basic method for compressing the headers of IPv4/TCP packets to improve performance over low speed serial links. VJ compression is the most commonly used header compression scheme in IP protocol stacks today. However, the evolution towards all IP networks has created new demands on header compression. Consequently, newer standards have developed with superior error recovery mechanisms, which work well on links that exhibit both non-trivial round-trip times and significant loss.
IETF RFC 2507 (IPHC). This technique compresses on a hop-by-hop basis, multiple IP headers including IPv4 and IPv6, TCP, UDP, ESP headers. The compression algorithms are specifically designed to work well over links with non-trivial packet-loss rates.
IETF RFC 2508 (CRTP) standard, developed in 1999, was justified primarily by the specific problem of sending audio and video over low speed serial links. CRTP compresses the headers of IP/UDP/RTP packets used for audio and video, reducing overhead on a hop-by-hop basis. CRTP performs best on local links with low round-trip times.
IETF RFC 3095 (ROHC) was developed in 2001. This standard can compress IP/UDP/RTP headers to just over one byte, even in the presence of severe channel impairments. This compression scheme can also compress IP/UDP and IP/ESP packet flows. ROHC is intended for use in wireless radio network equipment and mobile terminals to decrease header overhead, reduce packet loss, improve interactive response, and increase security over low-speed, noisy wireless links. ROHC has been adapted to work with link layer characteristics like those of GSM and CDMA and is known as Link Layer Assisted-ROHC (ROHC-LLA) Mux (tunneling):
Examples of Redundancy Schemes:
RTP redundancy (voice audio & video)—RFC 2198 (IETF)
ITU-T T.38 redundancy
ITU-T V.150 (SPRT) redundancy.
US 2006209796 describes a method for reducing voice and data over IP (VoIP) packet overhead in an Internet telephony system, and for regenerating missing or damaged data in a data packet. A media framer aggregates packets from multiple concurrent calls from several channels into a larger data packet. A transmission control module defines the format for each data packet, and updates and synchronizes header information in the data packets. A single virtual connection transmits data packets and other signals between originating and destination gateways located in the service areas for a caller and called party. System redundancy improves the quality of service by regenerating missing or damaged data in the packets.

The underlying assumption of the prior art solutions for the provisioning of protecting packets in a multiplexed traffic, is that the gap between two consecutive multiplexed frames is substantially less than the gap existing between the arrival of a packet and the arrival of its corresponding protecting packet. However, when the multiplexed frames are relatively long, it could well happen that both the original packet as well as its duplication, i.e. its protecting packet, may be comprised within a single frame. In such a case, if the original packet is lost or delayed, so will its protecting packet. Therefore, for such a case no protection is adequately provided to the original packet.

The disclosure of the references mentioned throughout the present specification is hereby incorporated by reference.

Thus, a method and a device are needed to solve the above-described problems and to provide an efficient and cost-effective solution for real-time bidirectional communication of multimedia while mitigating call latency.

SUMMARY OF THE DISCLOSURE

To overcome the limitations in the prior art described above, and to overcome other limitations that will become apparent upon reading and understanding the present description, it is the object of the present invention to provide an efficient real-time transport protocol multiplexing method and apparatus for use while providing real time services such as conversational voice audio and video multi-media services between IP media-gateways.

According to another object of the present invention, there is provided a method and means to allow transmission of current communication packets belonging to a number of communication sessions, without having to wait for the transmission of proceeding communication packets that belong to the corresponding communication sessions, in order to attach protection data associated with data contained in the currently transmitted communication packets, to the respective proceeding communication packets.

Further objects and features of the invention will become apparent to those skilled in the art, from the following description and the accompanying drawings.

In accordance with a first embodiment there is provided a method for providing efficient protection for communication packets conveyed in a packetized network which comprises:

providing a plurality of data frames belonging to different communication channels, each operative for conveying a communication session thereat, and preferably each of the plurality of data frames comprises an identification of a communication channel (e.g. UDP port) and/or of a communication session (e.g. video conference session) with which that respective data frame is associated;

providing protection data (also referred to hereinafter as "redundancy data") for protecting at least one of the plurality of data frames;

multiplexing one or more of the plurality of data frames into a communication packet;

transmitting the communication packet along a path comprised in the packets switched network; and wherein the communication packet comprises protection data for protecting at least one data frame that had already been transmitted in a communication packet that preceded the transmission of that communication packet.

In accordance with a preferred embodiment, the protection data comprised in the communication packet is attached to a second data frame, being at least one of the data frames comprised in that communication packet, and wherein the protection data is associated with a first data frame comprised in a preceding communication packet, and wherein each of the first and second data frames belong to a different communication session.

According to another preferred embodiment, the protection data comprises a mini header. Preferably, the mini header comprises identification of the channel associated with the communication session to which the first data frame belongs or of that communication session itself. In addition or in the alternative, the mini header comprises a unique channel identifier for each of the users associated with the plurality of data frames. More preferably, the channel identifier is assigned to communication packets transmitted from a user when the respective user initializes the communication session.

In addition or in the alternative, the mini header comprises at least one member of a group that consists of: an indication to denote that it is associated with protection data, an indication characterizing the type of protection provided by the protection data, the number of protecting frames that had already been sent (with or without including the current protecting packet), and the identification (e.g. sequence number) of the original frame for which protection is provided.

According to another preferred embodiment of the invention, the protection data comprises indication of the time stamp associated with the original data frame that was transmitted in the preceding communication packet, and which is protected by that protection data.

By yet another embodiment of the present invention, the original data frame transmitted within the preceding communication packet, and which is protected by the protection data, is associated with an interactive application, preferably an application which requires maintaining low delay between transmitting and receiving terminals. Such an interactive application is for example conversational session. The media that could be used in order to carry the information may be "voice", "audio", "video" or any type of data used during the session such as text, control, etc. Such signals could be voice signals, facsimile signals, voiceband data signals such as modem, DTMF and the like signals, signals used for signaling, audio, video etc. The terms "VoIP" or "IP telephony" as used herein are used to denote the transport of packetized voice and/or video signals and/or modem signals and also include enhanced services and complex infrastructure. It includes among others, PC-to-PC, PC-to-phone, phone-to-phone and any type of End-user devices applications whether the call transaction rides over the public Internet, the PSTN, or a private Internet connection such as an IP VPN. This term should be understood to include voice over IP as explained above but also voice over ATM, voice over frame relay, voice over DSL, voice over cable, voice over broadband, and the like.

Still another preferred embodiment is for transmitting facsimile communications and/or other voiceband data signals, in which case the original data frame that was transmitted in the preceding communication packet and which is protected by the protection data, is conveyed in a packet that is compatible with ITU Recommendation T.38 and carries facsimile signal, or a packet complying with ITU-T V.151 or V.152 recommendations carrying Modem over IP traffic.

According to yet another preferred embodiment, the method provided is used for transmitting video and audio communications signals that are RTP based video conference over IP according to IETF RFC 3551 or alternatively ISDN based video conference protocols according to ITU-T H.320 or telephony video conference according to ITU-T H.324.

By still another preferred embodiment of the invention, the method provided further comprises a step of preventing transmission of redundancy (protecting) data within the same communication packet that comprises the at least one data frame for which that protection data is intended to serve as protection. Preferably, the step of preventing transmission of protection data further comprises delaying the transmission of the protection data that should be transmitted within the same communication packet as the data frame for which the protection data is intended to serve as protection, and associating the protection data with a proceeding communication packet.

According to still another aspect there is provided a communication apparatus that comprises:

means operative to process a plurality of data frames received along different communication channels, or generated locally, wherein each of the different communication channels is operative to convey a communication session thereat, and preferably, each of the plurality of data frames comprises an identification of a communication channel and/or a communication session with which the respective data frame is associated;

means operative to retrieve and/or process and/or generate protection data for protecting at least one first data frame of the plurality of data frames, and to attach the protection data to at least one second data frame. Such means is also referred to hereinafter as "means operative to provide protection data";

multiplexing means operative to multiplex data of the at least one second data frame and the protection data attached thereto with data of at least one first data frame of the plurality of data frames, into a communication packet; and transmitting means operative to transmit the communication packet along a path comprised in the packetized network;

wherein the protection data is adapted to provide protecting data for at least one first data frame that had already been transmitted by the transmission means in a communication packet that was transmitted prior to the transmission of the communication packet in which the protecting data is transmitted; and wherein each of the first and second data frames belong to a different communication session.

In accordance with a preferred embodiment, the communication apparatus comprises means operative to attach protection data that is intended to protect a first data frame to a second data frame, and wherein that second data frame belongs to a communication session which is different from a communication session to which the first data frame belongs.

According to another preferred embodiment, the means operative to retrieve and/or process and/or generate protection data are further operative to provide protection data that comprises a mini header, which preferably comprises identification of the channel associated with the communication session to which the first data frame belongs or of the communication session itself.

In addition or in the alternative, the mini header comprises an indication to denote that it is associated with protection data.

According to another preferred embodiment, the means operative to retrieve and/or process and/or generate protection data are further operative to provide protection data that comprises indication of the time stamp associated with the original data packet that was transmitted in the preceding communication frame, and which is protected by that protection data.

According to still another preferred embodiment of the invention, the means for providing protection data (i.e. the means operative to retrieve and/or process and/or generate protection data) are further operative to provide protection data that comprises indication of the enumeration (e.g. sequence number) of the protection frame in order to differentiate one protection frame from others.

According to yet another preferred embodiment, the means operative to retrieve and/or process and/or generate protection data are further operative to provide protection data that comprises indication regarding the procedure that should be applied for utilizing the protection information, (e.g. indication of the type of the protection frame).

By still another preferred embodiment, the means operative to retrieve and/or process and/or generate protection data are further operative to provide protection data that comprises indication of the sequence number associated with the original data packet that was transmitted in the preceding communication frame, and which is protected by that protection data.

BRIEF DESCRIPTION OF THE DRAWINGS

The present invention will be understood and appreciated more fully from the following detailed description, taken in conjunction with the drawings in which.

DETAILED DESCRIPTION

In the following description of an exemplary embodiment, reference is made to the accompanying drawings which form a part hereof and in which is shown, by way of illustration, a specific embodiment for implementing the invention.

It is to be understood that other embodiments may be utilized as structural changes may be made, all without departing from the scope of the present invention.

The present invention provides an efficient method and apparatus for reducing delays and/or reducing overhead associated with conveying IP packets between IP media-gateways connected by an IP network that comprises multiplexing means while still maintaining low delay and low overhead and reduced number of packets in order to deliver reasonable service quality for real time multi-media conversational applications over the IP network.

The foregoing description of an exemplary embodiment of the invention is presented for the purposes of illustrating the invention. It is not intended to be exhaustive or to limit the invention to the precise form disclosed. Many modifications and variations are possible in light of the above teaching. It is intended that the scope of the invention be limited not by this detailed description, but rather by the claims appended hereto.

Figure 1:
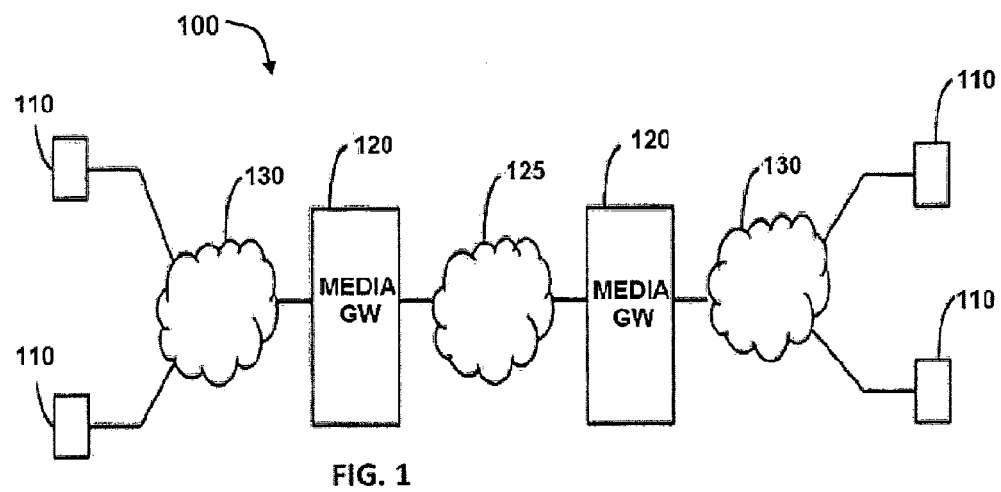
FIG. 1 shows an application scenario in which two sides of a communication session are interconnected via an IP network.

FIG. 1 shows an application scenario in network 100 in which two user sites 110 (that may be VoIP terminals) are interconnected by media-gateways 120, located at two ends of an IP network 125. In such application, an interactive audio and video conversation (or just a telephone call) between users 110 located at either side of the media-gateways 120, is carried by a separate RTP/UDP/IP connection. The codecs used at the user sites or at the media-gateway to compress the signals, generate packets with a size typically ranging from 5 to 20 bytes. When using a voice codec operative in accordance with ITU-T Recommendation G.711, the packet size may typically range between 40 to 160 bytes per packet (5 to 20 msec).

For example, ITU-T Recommendation G.729 specifies a voice compression algorithm that generates 10 bytes every interval of 10 ms speech sample (a frame). Typically, two frames of 10 bytes each are sent in one IP packet, every msec. Many other voice compression algorithms also generate small packets. However, these small size packets require a large overhead when they are transferred using the Real time Transport Protocol (RTP).

The RTP/UDP/IP overhead is 40 bytes (12+8+20) for each speech packet. For example, if a 20 bytes packet is transferred via RTP/UDP/IP, then the overhead is 67%, i.e., 40/(40+20), and consequently the usage of the available bandwidth is inefficient. In addition, the large number of packets is likely to overload the network resources such as routers, thereby resulting in congestion conditions and poor performance of the network (e.g.: high delays, high packet loss rate, etc.).

Congestion in IP networks results in packet loss at routers and UDP does not have any retransmission mechanism to recover lost packets. Also, real time applications such as speech are intolerant to delay caused by re-transmission. In a normal RTP method, each individual speech packet is transmitted as an IP packet, which generates a large number of packets between the media-gateways. This heavy traffic volume is a potential scenario for congestion and packet loss at IP routers.

The large overhead associated with the transfer of small packets (compressed speech) through RTP/UDP/IP has been one of the drawbacks of IP telephony. In order to minimize the overhead, RTP/UDP/IP header compression together with tunneling (or channel multiplexing) is preferably applied.

The common way to provide protection to a data frame which might get lost during its conveyance in a communication packet along a path extending in an IP network, is to duplicate this data frame once (or even more than once) where each duplicated copy serves as a protection data frame, in order to increase the possibility that at least one of the copies reaches the frame's destination. However, duplicating the data frame (especially when the packets are relatively short packets), together with the associated header, introduces once again a substantial overhead which results in low utilization of the available bandwidth, as well as in an increase in the number of packets that may drive routers into congestion conditions. The common solution to overcome this problem may be achieved by aggregating a number of frames, i.e. the original frame and those frames which carry protection information, that belong to the same communication session to form one communication packet, as the latter requires only one packet and one header in order to specify the destination of all the data frames that are aggregated within that communication packet. However, this solution has its own drawbacks because protection frames would not be transmitted before a proceeding frame that belongs to the same communication session is prepared for transmission, in order to ensure that the communication packet is populated with the required number of frames that may share the same header. Now, let us assume that a current data frame is ready for transmission and is being duplicated, and assume that by the time required for completing the duplication, a communication packet that comprises the original current frame has already been transmitted towards its destination. The next communication packet that will contain the duplication of the current data frame (i.e. the redundancy frame for protecting the original frame) together with say the two next frames, each of which being a 20 msec frame, will be transmitted 40 msec after the time at which the packet that contains the original current frame was transmitted. In the case where the packet that contains original current frame is lost, there will be a gap of at least 60 msec between the reception of a frame that preceded the lost frame and the reception of its duplication. Under different scenarios such delays might be even much longer delays, causing an adverse effect upon the performance of the system, having to enlarge the jitter buffer to allow compensating for such delays, which in turn also creates problems in voice, audio and video type communications as well as with the associated voice band modems.

Therefore, the present invention aims to enable efficient reduction of such delays that might be incurred while transmitting efficiently data frames and redundant data frames for protecting these data frames, in systems having multiplexing/tunneling capabilities.

Figure 2:
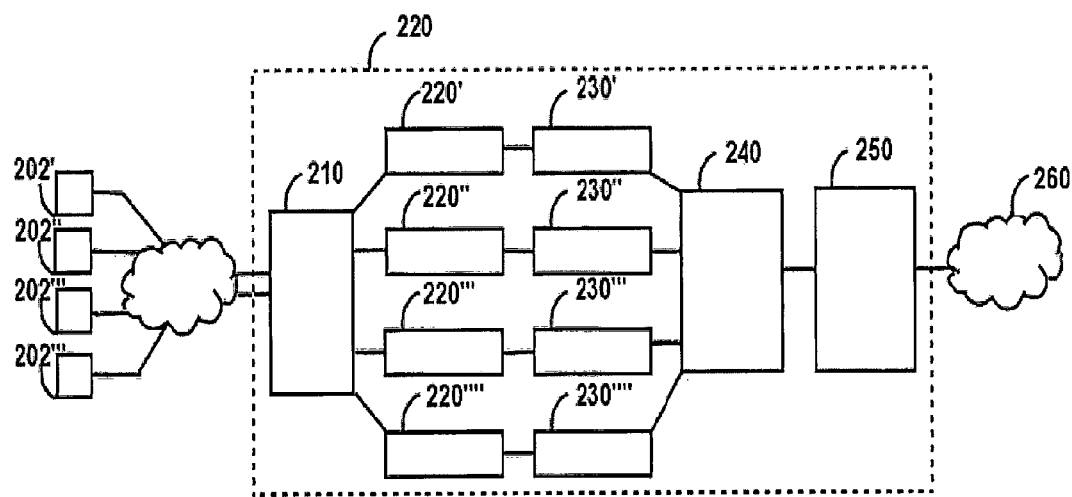
FIG. 2 illustrates an apparatus constructed in accordance with an embodiment of the present invention
Figure 2A:
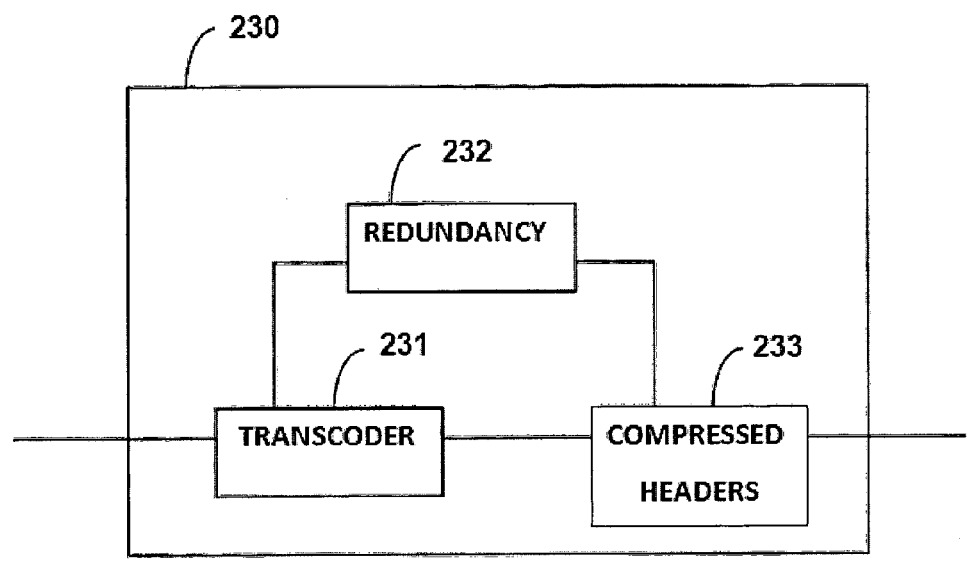
FIG. 2A illustrates an exploded view of processor 230"
Figure 2B:
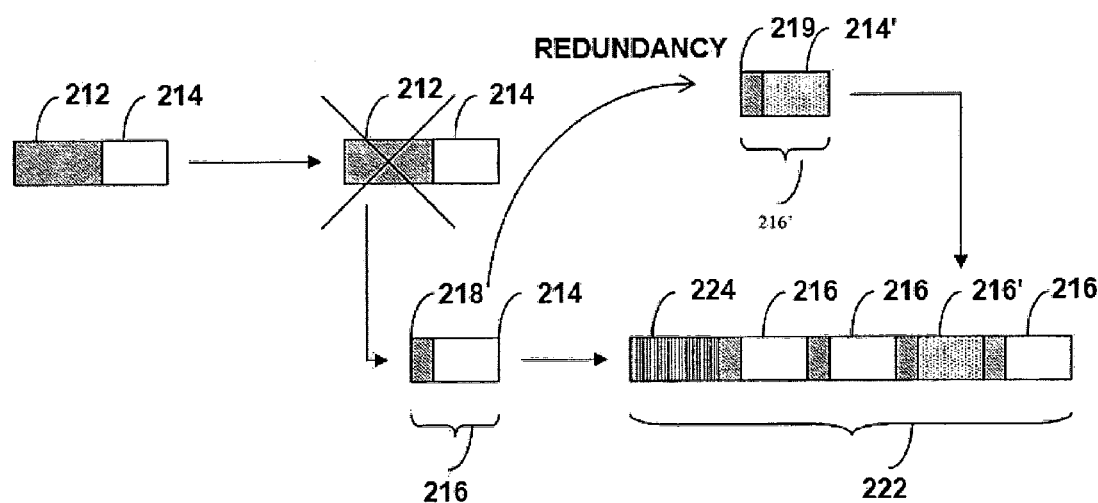
FIG. 2B demonstrates an example of a process which a packet may undergo according to an embodiment of the present invention.

FIG. 2 illustrates an apparatus 200 constructed in accordance with an embodiment of the present invention. Users 202'-202'''' transmit the communication packets towards apparatus 200. The communication packets are received at receiver 210 and as may be seen in FIG. 2B, they typically comprise a header 212 and a payload 214. The packets are then forwarded to a plurality of decoders 220'-220'''' (e.g. RTP decoders), associated respectively with the plurality of sessions (identified by their UDP ports) where they are stripped off from their headers 212 and then forwarded to their respective processors (230' to 230''''), in which the signals may be transcoded as illustrated in the exploded view of processor 230' by transcoder 231. Protection/redundancy data may be generated by processor 232 and new condensed (mini) headers 218 are attached by processor 233, thereby forming a plurality of frames 216. Protection data is generated in processor 230' (by 232) for protecting at least one of data frames 216 (if such protection data has not been received via receiver 210). Aggregator 240 aggregates/multiplexes data frames 216 having their new headers 218 as well as protection data for protecting data frames that were already transmitted. The data frames comprise protection information 214' and a header 219, and are aggregated into a communication packet 222 that comprises a packet header 224 and a plurality of data frames 216 and 216'. The multiplexed communication packets are then transmitted by transmitter 250 along respective paths comprised in packetized network 260 towards their respective destinations.

Figure 3:
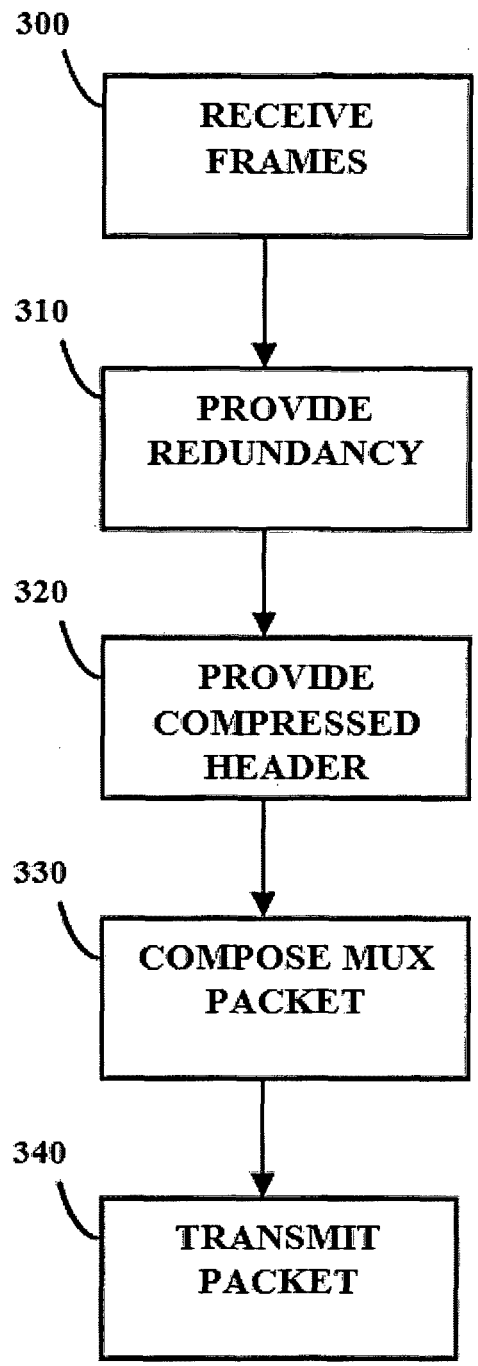
FIG. 3 is a flow chart demonstrating a method for carrying out an embodiment of the present invention.

FIG. 3 illustrates a flow chart demonstrating an example of carrying out the method according to the present invention for reducing delays associated with received packets in a packetized network.

First, a plurality of data frames is provided (step 300). These data frames are received from one or more devices located upstream to the apparatus at which this example is carried out. The data frames, which are preferably short frames in order to avoid accumulation of undue delays, belong to different communication sessions, each being conveyed along a communication channel. Preferably each of the plurality of data frames comprises identification of a communication channel and/or of a communication session with which that respective data frame is associated.

Next, redundancy data is provided (step 310) for protecting one or more of the plurality of data frames (e.g. duplication of the data load comprised in each of the one or more of the plurality of data frames). Such redundancy data is typically not received/transmitted together with the original data frame, but is forwarded within a communication packet towards its destination later than that original data frame. To do so according to the solution provided by an embodiment of the present invention, there is no need to wait for the next frame that belongs to the same communication session as the original data frame for which the redundancy data is to be transmitted, but instead the redundancy data is attached to an available (preferably the first available) packet even though it will probably comprise data frames that belong to different communication sessions. The redundancy data is attached with an IP header and/or a UDP header, but is preferably provided with a mini header, provided in step 320, that comprises an indication of the channel (i.e. the communication session) to which the protected data frame belongs. Such an indication could point any one or more of the following: the channel used for that communication session in the multiplexed frame, the relative position of that channel in the tunnel formed to convey the multiplexed frames, a compressed header, that the associated payload contains redundancy data, the time stamp and/or sequence number of the original data frame with which the redundancy data is associated, and the like.

In step 330, a plurality of data frames some of which are associated with redundancy data for protecting data frames that had already been transmitted, are multiplexed into a first communication packet, and in step 340 the communication packet is transmitted along a path comprised in the packetized network.

It will be appreciated that the above-described methods may be varied in many ways, including but not limited to, changing the exact implementation used. It should also be appreciated that the above described description of methods and networks are to be interpreted as including network in which the methods are carried out and methods of using the network components.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all the features shown in a particular figure. Variations of embodiments described will occur to persons of the art. Furthermore, the terms "comprise", "include", "have" and their conjugates shall mean, when used in the claims "including but not necessarily limited to".

The invention claimed is:

1. A method of reducing delays associated with communication packets conveyed in a packetized network, comprising:
   providing a plurality of data frames belonging to different communication sessions conveyed along respective communication channels;
   providing protection data for protecting at least one of said plurality of data frames; and
   multiplexing one or more of said plurality of data frames into a second communication packet, wherein said second communication packet comprises
protection data for protecting at least one first data frame
that had already been transmitted in a first communication packet which transmission preceded a transmission
of the second communication packet, the at least one
first data frame belonging to a first communication session, wherein said protection data comprised in the second communication packet is attached to a second data frame,
being at least one of the data frames multiplexed into the
second communication packet, the second data frame
belonging to a second communication session and having a second frame header that identifies the second
communication session to which the second data frame
belongs, wherein the protection data is operative to protect the at
least one first data frame being at least one data frame
transmitted in the first communication packet, the protection data being attached to the second data frame with
a first frame header that identifies the first communication session to which the at least one first data frame
belongs, and wherein the first communication session to which the at
least one first data frame belongs is different from the
second communication session to which the second data
frame carrying the protection data for the at least one
first data frame belongs.

2. The method according to claim 1, wherein said protection data comprises at least one member of the group that consists of:
   an identification of a channel associated with the first communication session to which said first data frame belongs;
   an identification of the first communication session to which said first data frame belongs;
   a unique channel identifier for each of a plurality of users associated with said plurality of data frames;
   an indication denoting the association of said at least one second data frame with protection data;
   an indication denoting a type of protection provided;
   an indication of a time stamp and/or sequence number associated with said at least one first data frame; and
   an indication denoting the enumeration of the protection frame.

3. The method according to claim 1, wherein an original data frame that was transmitted in the preceding first communication packet and which is protected by said protection data comprises voice information or voiceband data information or audio information or video information.

4. A method of reducing delays associated with communication packets conveyed in a packetized network, comprising:
   providing a plurality of data frames belonging to different communication sessions conveyed along respective communication channels;
   providing protection data for protecting at least one of said plurality of data frames; and
   multiplexing one or more of said plurality of data frames into a second communication packet,
   wherein said second communication packet further comprises protection data for protecting at least one first data frame that had already been transmitted in a first communication packet which transmission preceded a transmission of the second communication packet,
   wherein said protection data comprised in the second communication packet is attached to a second data frame being at least one of the data frames comprised in that second communication packet,
   wherein the protection data is operative to protect a first data frame being at least one data frame comprised in the first communication packet, and
   wherein each of said first and second data frames belongs to a different communication session; and
   preventing transmission of protection data frames within a communication packet which comprises the at least one data frame for which said protection data is intended.

5. The method of claim 4, wherein said step of preventing transmission of protection data comprises delaying transmission of protection data that should be comprised within the communication packet that comprises the data frame for which said protection data is intended, and transmitting that protection data in a proceeding communication packet.

6. A communication apparatus, comprising:
   means operative to process a plurality of data frames received along different communication channels, wherein each of the different communication channels is operative to convey a communication session thereat;
   means operative to retrieve and/or process and/or generate protection data for protecting at least one of the plurality of data frames and to attach the protection data to at least one second data frame, the at least one second data frame belonging to a second communication session and having a second frame header that identifies the second communication session to which the at least one second data frame belongs;
   multiplexing means operative to multiplex the at least one second data frame and the protection data attached thereto, with one or more of the plurality of data frames into a second communication packet; and
   transmitting means operative to transmit the second communication packet along a path comprised in a packetized network;
   wherein the protection data is adapted to provide protecting data for at least one first data frame that had already been transmitted by the transmission means within a first communication packet that was transmitted prior to the transmission of the second communication packet in which the protecting data is transmitted, the at least one first data frame belonging to a first communication session, the protection data being attached to the at least one second data frame with a first frame header that identifies the first communication session to which the at least one first data frame belongs, and
   wherein the first communication session to which the at least one first data frame belongs is different from the second communication session to which the second data frame carrying the protection data for the at least one first data frame belongs.

7. The communication apparatus according to claim 6, further comprising:
   means operative to attach, to the at least one second data frame, the protection data that is intended to protect the at least one first data frame,
   wherein said at least one second data frame belongs to the second communication session which is different from the first communication session to which said at least one first data frame belongs.

8. The communication apparatus according to claim 6, wherein said means operative to retrieve and/or process and/or generate protection data are further operative to provide the protection data that comprises the first frame header, the first frame header being a mini header.

9. The communication apparatus according to claim 8, wherein the mini header comprises an indication denoting that it is associated with the protection data.

10. The communication apparatus according to claim 6, wherein said means operative to retrieve and/or process and/or generate protection data are further operative to provide protection data that comprises an indication of a time stamp and/or sequence number associated with an original data packet that was transmitted in a preceding communication frame, and which is protected by said protection data.

11. A communication apparatus, comprising:
  means operative to process a plurality of data frames received along different communication channels, wherein each of the different communication channels is operative to convey a communication session thereat;
  means operative to retrieve and/or process and/or generate protection data for protecting at least one of the plurality of data frames and to attach the protection data to at least one second data frame;
  multiplexing means operative to multiplex the at least one second data frame and the protection data attached thereto with one or more of the plurality of data frames into a second communication packet; and
  transmitting means operative to transmit the communication frame along a path comprised in a packetized network,
  wherein the protection data is adapted to provide protecting data for at least one first data frame that had already been transmitted by the transmitting means within a first communication packet that was transmitted prior to a transmission of the second communication packet in which the protecting data is transmitted,
  wherein each of said first and second data frames belongs to a different communication session, and
  wherein said means operative to retrieve and/or process and/or generate protection data are further operative to provide protection data that comprises an indication of the enumeration of the protection.

12. The communication apparatus according to claim 6, wherein said means operative to retrieve and/or process and/or generate protection data are further operative to provide protection data that comprises an indication of a type of the protection data.

13. The communication apparatus according to claim 6, wherein said means operative to retrieve and/or process and/or generate protection data are further operative to provide protection data that comprises an indication of a sequence number associated with an original data packet that was transmitted in the at least one first data frame, and which is protected by said protection data.

\* \* \* \* \*